Patented July 23, 1946

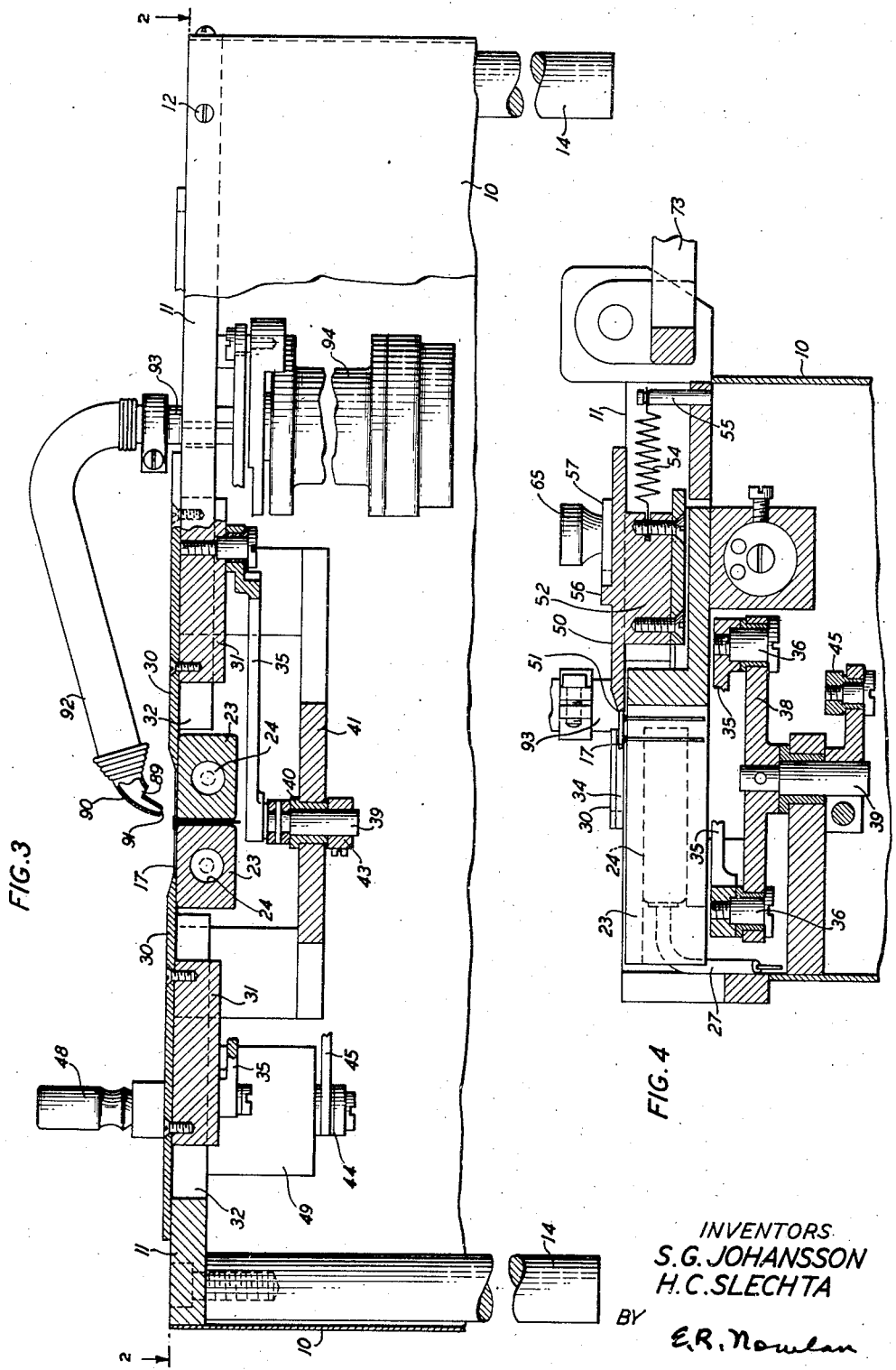

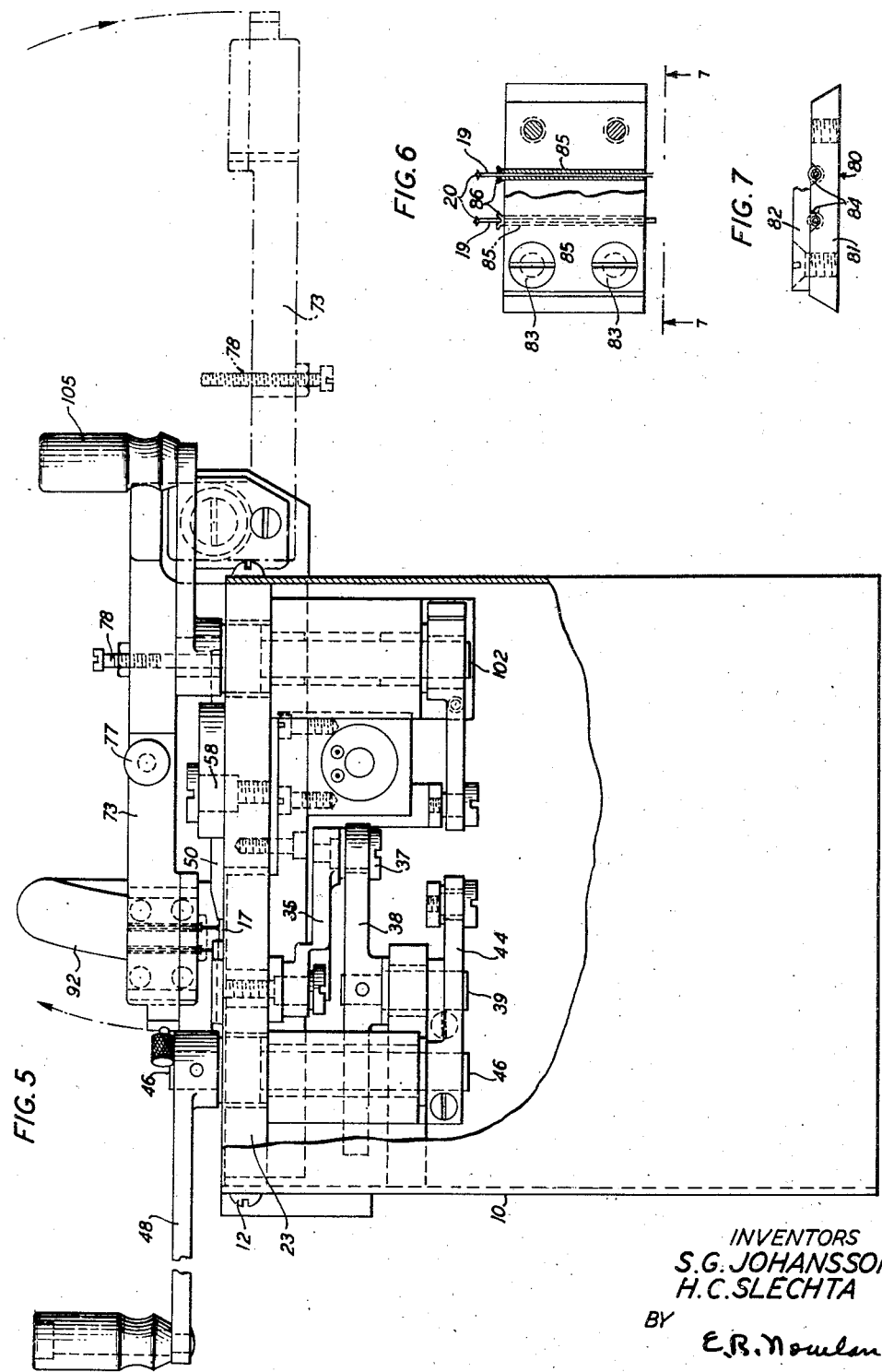

2,404,730

UNITED STATES PATENT OFFICE 2,404,730

SOLDERING APPARATUS

Sven G. Johansson, Cranford, and Henry C. Slechta, Plainfield, N. J., assignors to Western Electric Company, Incorporated, New York, N. Y., a corporation of New York Application May 2, 1944, Serial No. 533,714

5 Claims. (Cl. 113—59)

This invention relates to soldering apparatus, and more particularly to apparatus for soldering terminals to quartz crystals.

In the manufacture of certain electrical units for use in the field of telephony, quartz crystals are used and in certain instances terminals are to be secured, by suitable means such as soldering, to the silver or other metal coatings on the crystals.

An object of the invention is to provide an apparatus which is simple in structure, readily actuable, and highly variable for soldering parts to articles, particularly terminals to crystals.

With this and other objects in view, the invention comprises a support for an article, elements to clamp the article on the support, variable means to locate articles of various contours on the support, and means to successively solder parts to the articles.

Other objects and advantages will be apparent from the following detailed description when considered in conjunction with the accompanying drawings, wherein Fig. 1 is a top plan view of the apparatus for soldering terminals to one type of article;

Fig. 3 is a fragmentary vertical sectional view taken substantially along the line 3—3 of Fig. 1;

Fig. 4 is a fragmentary vertical sectional view taken substantially along the line 4—4 of Fig. 1;

Fig. 5 is a front elevational view of the apparatus, with a portion of the housing broken away and the terminal feeding unit shown in dot and dash lines in its loading position and in solid lines in its feeding or soldering position;

Fig. 6 is an enlarged front elevational view of one of the terminal supporting elements to be mounted in the feeding unit, portions of the element being broken away;

Fig. 7 is a bottom plan view of the element shown in Fig. 6, this view being taken along the line 7—7 of Fig. 6, and Fig. 8 is a perspective view of another type of article with the terminals soldered thereto.

Figure 1:
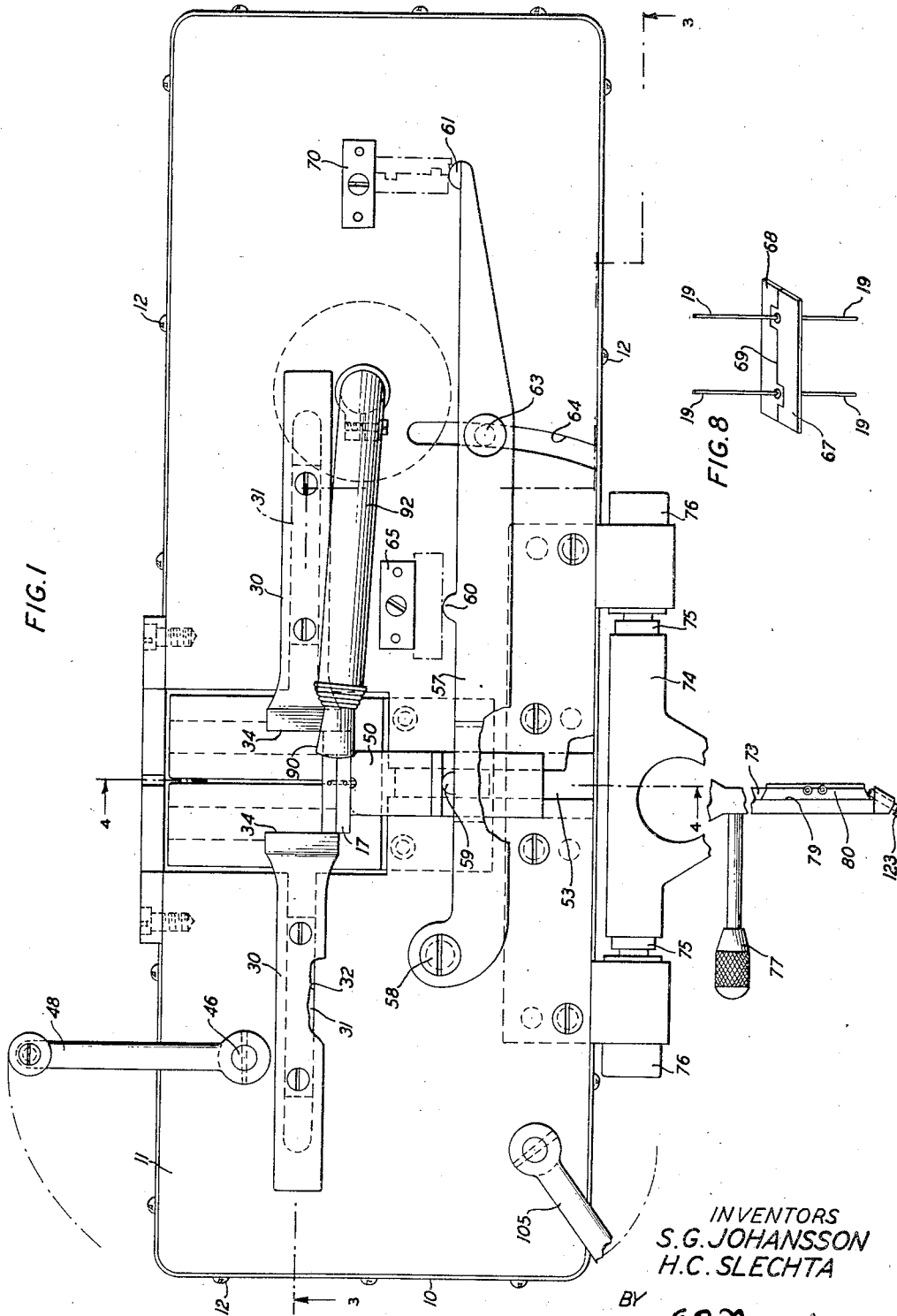

Considering now the drawings, the apparatus includes a housing 10 receiving a table 11 in the upper end thereof, the latter being secured in place by suitable means, such as screws 12. To assist the housing in supporting the table, legs 14 are disposed at the spaced positions shown, particularly in Fig. 2, and are secured to the table at their upper ends through the aid of screws 15. In the present embodiment quartz crystals of varied contours or sizes are to receive wire-like terminals, the latter to be secured by soldering to the silver coating on the crystal. Consider, for example, an article or crystal 17 shown in Figs. 1, 3, 4 and 5. This crystal is in reality somewhat larger than illustrated in Figs. 1 and 3, the full width, however, being illustrated in Figs. 4 and 5. This particular crystal is coated upon both sides with a metallic material such as silver, the metallic coatings upon each side being divided in half longitudinally of the crystal, as indicated by the center line in the crystal in Fig. 1. It is, therefore, desirable to secure, by soldering, a terminal to each of these metallic portions adjacent the centers thereof. This necessitates, therefore, the securing of two terminals upon each side of the article or crystal. The terminals are best shown in Fig. 6 and are formed of phosphor-bronze wires 19 with flattened ends or heads 20.

The table 11 is cut away, at 22, to receive a heated support, which may be termed a hot plate, formed of two portions 23, with individual heating units 24 therein and spaced from each other as indicated at 25 (Fig. 2) to readily receive the terminals 19, which have been soldered to one side of the article, during the reversing of the article to receive another set of terminals upon the opposite side thereof. The heating units 24 may be of the electrical type, provided with suitable electrical energy through conductors, one of which is indicated at 27 in Fig. 4.

Retaining or clamping elements 30, disposed in alignment with each other upon the table 11, have guides 31 fixed to the under surfaces thereof and movably disposed in aligned elongate slots 32 in the table 11.

The mounting of the clamping elements 30 for movement in aligned paths, although in opposing directions, causes their article engaging faces 34 to be positioned parallel with each other and with the space or opening 25 between the portions 23 of the hot plate or support. Means is provided for simultaneously moving the elements 30 so that their article engaging faces will be disposed equal distances from the space or opening 25 to cause the center of the articles, to be clamped thereby, to be positioned in alignment with the said opening. This means includes links 35 pivotally connected at their outer ends, as at 36, to their respective guides 31 and pivotally connected at their inner ends, at 37, to the outer ends of a lever 38. The lever 38 is fixedly mounted upon a vertical shaft 39, the axis of the shaft being disposed midway between the pivots 37. Furthermore, the distances between the pivots 36 and 37 of each of the links are equal, so that through rotation of the shaft 39 in either direction, the clamping elements 30 will be moved equal distances toward or away from the center 25 of the support or hot plate. The shaft 39 is journalled in a suitable bearing 40 which is mounted in a bracket 41 carried by the table 11. Beneath the bracket 41, as illustrated in Fig. 3, a lever 43 is fixedly mounted upon the shaft 39 and is operatively connected to a lever 44 through the aid of a link 45. The lever 44 is fixedly mounted upon a vertical shaft 46 which extends through the table 11 and has a hand lever 48 mounted thereon. A suitable bearing 49, supported by the table and positioned therebeneath, is provided for the shaft 46.

A locating element 50, of the cross-sectional contour illustrated in Fig. 4, has an article engaging face or surface 51 to engage the article 17 to position it between the clamping elements 30. The upper portion of the locating element 50 rests upon the table 11 and has a downwardly projecting integral portion 52 which is disposed in an elongate aperture 53 in the table to serve as a guide for the element in movement relative to the clamping elements 30. An expansion spring 54, having one end fixed to a pin 55 and the other end fixed to the guide portion 52, as illustrated in Fig. 4, normally urges the locating element 50 away from the article support. An integral lug 56, extending upwardly from the upper surface of the locating element 50, is to serve in conjunction with a positioning arm 57 for the positioning of the locating element relative to the support, depending upon the type or contour of the articles upon which the terminals are to be soldered.

The positioning arm 57 is of the contour illustrated in Fig. 1, pivotally supported, at 58, upon the table 11 and having rounded projections 59, 60 and 61 integral with one side thereof and disposed at known distances or spaced positions from the pivot 58. A locking bolt 63 is carried by the positioning arm 57 and extends through an elongate aperture 64, which is arcuate in general contour, the center line of its radius being at the center line of the pivot 58. Through the aid of this means, the positioning arm 57 may be locked in varied positions to hold the element 50 for articles of various contours. The rounded projection 59 of the positioning arm 57 engages the integral lug 56 of the element 50. The rounded projection 60 of the positioning arm functions in conjunction with a positioning block 65, the latter being mounted upon the table 11. The positioning block 65 is disposed relative to the positioning arm 57 so that, when an article or crystal of the type shown at 17 is to receive the terminals, the apparatus may be conditioned to receive these articles through the accurate location of the element 50 by disposing one of the articles between the rounded projection 60 and the positioning block 65.

In Fig. 8, another type of article is shown and indicated at 68. In this instance the article is a quartz crystal, with metallic coatings upon the opposing faces thereof, the dividing lines of the coatings, indicated at 69, extending longitudinally of the crystal, as illustrated, and having terminals 19 secured to the various metallic cover portions. With this type of crystal it is necessary to solder the terminals 19 singly to the various portions which are disposed like distances from their ends. A positioning block 70 (Fig. 1), mounted upon the table 11 relative to the rounded projection 61 of the positioning arm 57, cooperates therewith in conditioning the apparatus, through the adjustment of the positioning element 50, to receive this type of article by placing one of the articles, as indicated in dot and dash lines in Fig. 1, longitudinally between the positioning block 70 and the rounded projection 61. In this manner the apparatus will be conditioned to receive this type of article, although there may be various sizes thereof, each size varying the initial setting of the positioning element 50.

The terminal feeding unit shown in Figs. 1 and 5 includes an arm 73, which is L-shaped in general contour, a base or leg portion 74 of which has bearing members 75 in the ends thereof to receive the inner ends of supporting screws 76. Thus the arm 73 or feeding unit is supported for pivotal movement from the loading position shown in dot and dash lines in Fig. 5 to the feeding position shown in solid lines therein. Through the aid of a handle 77, this movement may be brought about, the unit being limited in its movement toward the article by a stop screw 78 threadedly carried by the arm and positioned to engage the table 11. The outer end of the arm is reduced or recessed as at 79, forming a substantially dovetail groove therein for removably receiving any one of a plurality of terminal holders 80. The holders 80 include companion members 81 and 82 fixed together through the aid of screws 83. The member 81 has a dovetail contour as illustrated in Fig. 7, to be readily receivable in the recesses 79 of the arm 73. V-shaped grooves 84 are formed in the inner face of the member 81 and in these grooves tubes or sleeves 85 are disposed, they being held in place by the member 82. The upper ends of the tubes 85 (Fig. 6) are flared outwardly as at 86, so that the terminals 19 may be readily disposed in the tubes. Furthermore, the inner diameters of the tubes are such that the terminals therein will be frictionally held therein during movement from the loading position to the feeding or soldering position.

Figure 2:
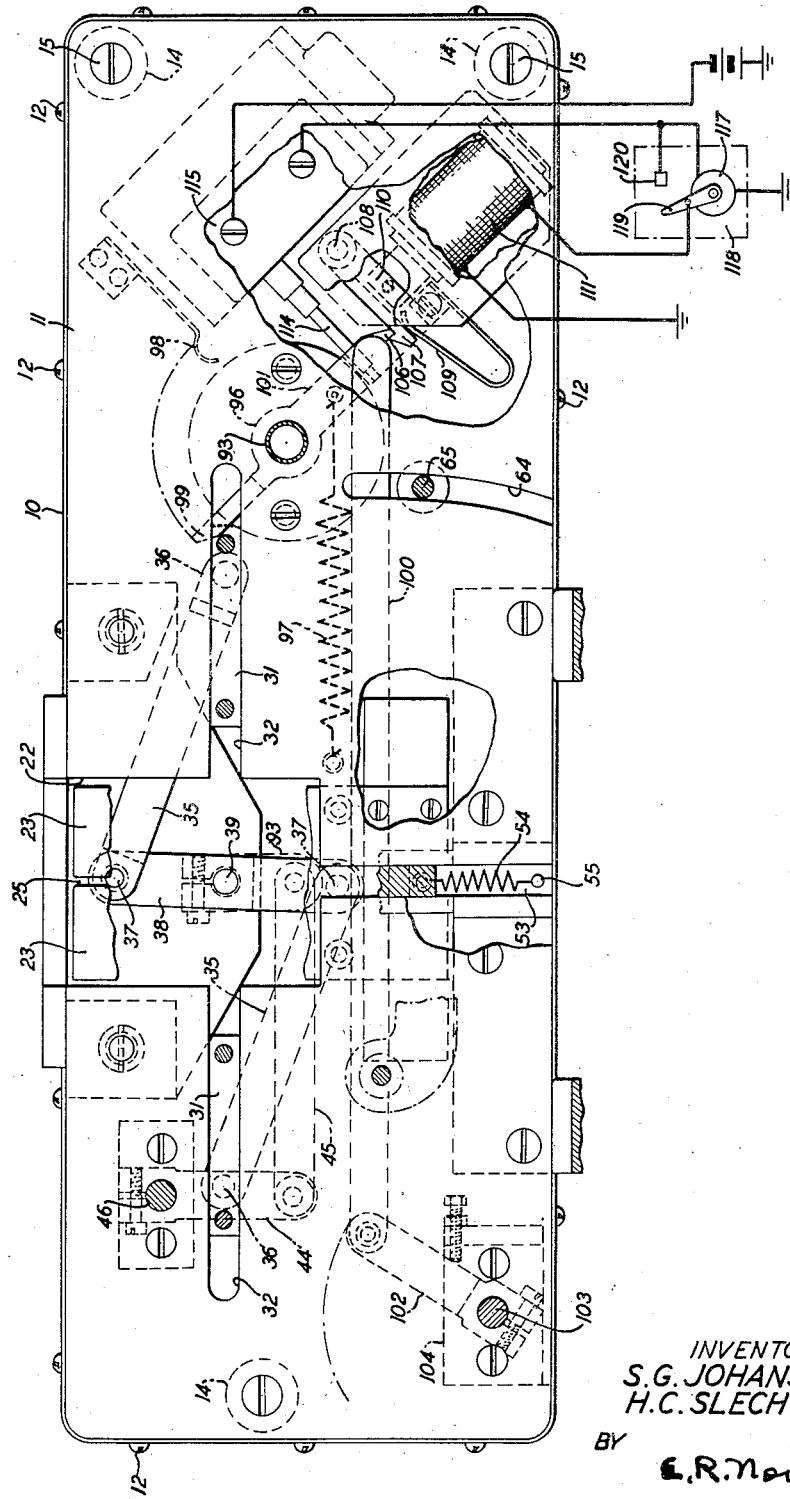
Fig. 2 is another top plan view of the apparatus, portions thereof being broken away to illustrate certain features which are not shown in Fig. 1, this view being taken substantially along the line 2—2 of Fig. 3.

The means to provide or apply heat at the juncture of the terminals and articles, or crystals, includes a nozzle 90 with a broad mouth or outlet 91 adapted to direct a stream of hot air to the positions where the soldering is to take place. An outlet 89 is provided in the nozzle to direct a curtain of heated air toward the support to eliminate the possibility of the said stream of air from drawing a sheet of cold air over the crystal and disturbing the soldering operation. The nozzle 90 is carried by a tube 92 of the contour shown in Fig. 3, the tube being mounted upon a rotatable pipe connection 93 which provides communication between the tube and a hot air supply means 94. The last mentioned means is not shown in detail, but may include any suitable structure, such as a motor driven fan, for forcing air through a heating unit. The connection or pipe 94 extends through the table 11 and has a lever 96 fixed thereto (Figs. 2 and 3). The lever 96 is normally urged clockwise through the aid of a spring 97, a bumper spring 98 serving to be engaged by an arm 99 of the lever to limit the movement of the latter clockwise and to cushion the stopping of its movement in that direction. A link 100 operatively connects another arm 101 of the lever 96 to another lever 102. The lever 102 is mounted upon a shaft 103 which is supported by a suitable bearing 104 and extends vertically through the table 11, where a hand lever 105 is mounted upon the upper end thereof.

Through the actuation of the hand lever 105 in a clockwise direction (Fig. 1), the lever 102 and the link 100 will cause movement of the lever 96, from its normal position in engagement with the bumper spring 98, where the nozzle 99 will be positioned to one side of the article, into the soldering position as illustrated in Figs. 1 and 2. When the lever 96 is moved into the position shown in Fig. 2, a projection 106 is engaged by a latch 107 and thus held in this position until the latch is released. The latch 107 is pivotally supported, at 108, and is normally urged into the latching position through the aid of a spring 109. A solenoid, including a core 110 and a winding 111, is positioned to actuate the latch 107 when energized, to move it against the force of the spring 109 free of the projection 106 of the lever 96. During movement of the lever 96 into the position shown in Fig. 2, a plunger 114 of a switch 115 is actuated to close the switch to complete a circuit from grounded battery through a motor 117 to ground, the motor being a part of a time control unit 118 including a contact pointer 119 and a contact 120. Through the simple circuit shown in Fig. 2, including the switch 115 and the winding 111 of the solenoid, it will be understood that at given time, subsequent to the latching of the lever 96 in the position shown in Fig. 2 under the control of the unit 118, a circuit will be completed from the grounded battery through the closed switch 115, contacts 120 and 119, and, through the winding 111, to ground, causing energization of the solenoid to release the latch 107.

Considering now the operation of the apparatus, let it be assumed that crystals or articles of the type shown at 17 are to receive terminals, the latter to be soldered at substantially the center points of the metallic coatings on both sides thereof. The bolt 63 (Fig. 1) for the positioning arm 57 is loosened and the arm is moved clockwise to allow for the positioning of one of the articles or crystals between the projection 60 and the locating block 65, as indicated in dot and dash lines in Fig. 1. The arm 57 is then moved counterclockwise until the projection 60 meets the article and forces it into intimate engagement with the block 65. The bolt 63 is then tightened and the apparatus is in readiness to begin the soldering operation. It is assumed, however, that the means for forcing the heated air through the nozzle is in operation, and that the preferred terminal holder 80 is placed in the recess 79 of the arm 73 and held in place by a screw 123.

The operation begins with the feeding unit or arm 73 in the loading position. Here the flared ends of the tubes 85 are uppermost and the operator may readily position two of the terminals in the tubes, with the flattened ends of the terminals uppermost. The flattened ends of the terminals have small quantities of solder thereon, and to these quantities of solder a suitable flux may be added by the operator. However, before moving the feeding arm into the soldering position, the article or crystal to receive the terminals is positioned upon the support or hot plate, as illustrated in Fig. 1, adjacent the locating element 50, after which the lever 49 is actuated to cause the mechanism connecting it with the clamping elements 30 to move the latter so that their engaging faces 34 will engage the ends of the article and not only grip and hold the article against displacement but center the article with respect to the terminals when brought into registration therewith. While holding the lever 48 actuated, the feeding arm 73 is moved about its pivot to locate the terminals carried thereby adjacent the article. When in this position the operator may be assured of the engagement of the terminals with the portions of the crystal by tapping the upper ends thereof lightly to cause them to move downwardly in the tubes if they should at that time be spaced from the crystal. The operator then actuates the hand lever 105 to move the heat applying means, namely the nozzle 90, into position closely adjacent the meeting portions of the terminals and the crystal, so as to apply the heated air for a given length of time to these portions, to melt quantities of solder then disposed between the ends of the terminals and the coating on the crystal. This given length of time is under the control of the timing unit 118.

As previously described, during this operation of the hand lever 105 to bring the nozzle 99 into position, the switch 115 is actuated by the lever 96 at approximately the time the latch 107 holds the lever in the operated position, the closing of the switch starting the function of the timing unit so that after the given length of time, necessary for the movement of the contact 119 into engagement with the contact 120, the hot air is continuously applied, but after this time interval the solenoid is energized to release the latch 107 and free the lever 96 for movement, through the force of the spring 97, into its normal position.

During this operation, one set, that is, two terminals, has been soldered to the article, and prior to the application of the heated air to the article, the article has been heated by having been placed upon the hot plate or support. The article is then released from the clamping elements 30 by movement of the lever 48 into its normal position, after which the feeding arm 73 may be removed into its loading position, moving the terminals with the article fixed thereto into this position. The structure thus far formed is removed from the holder 80 and located again by the support or hot plate in the reverse position, with the terminals thereon extending downwardly as illustrated in Figs. 3 and 4. The soldering operation may again be repeated by the placing of another set or pair of terminals in the holder 80, applying given quantities of solder to the flattened ends thereof, actuating the lever 48 to clamp the crystal or article into position, moving the feeding arm 73, through the aid of the handle 77, into the soldering position and actuating the lever 105 to move the nozzle 90 into the soldering position shown in Fig. 1. Here again the timing cycle takes place through the closing of the switch 115, the nozzle having been latched in position until released through the energization of the solenoid under the control of the timing unit 118. This completes the soldering of terminals upon both sides of the article, and the mechanism may be returned to its normal position and the operating cycles repeated for the continued application, by soldering, of terminals to other crystals.

Without varying the timing means or any of the other mechanism or the method of operation of the apparatus, it may be conditioned, merely through the adjustment of the locating arm 57, for forming the structure shown in Fig. 8, by first varying the location of the element 50 through the adjustment of the arm 57 by positioning one of the crystals 68 between the projection 61 and the locating block 70.

The purpose of heating the hot plate or support 23—23 is to condition the article or crystal to withstand the heat from the nozzle 90 without possible damage to the crystal, which might occur if the hot blast of air should be applied to a cold crystal. The heat applied to the crystal from the hot plate is not sufficiently high to soften the solder or to prevent solidification thereof.

Although specific improvements of the invention have been shown and described, it will be understood that they are but illustrative and that various modifications may be made therein without departing from the scope and spirit of this invention as defined by the appended claims.

What is claimed is:

1. In a soldering apparatus, a support for articles of varied contours, a unit movable relative to the support to successively feed parts to a given position relative to the support for soldering to the articles, a locating element, a positioning member, an arm pivotally supported for movement relative to the positioning member varied distances measured by articles disposed between the positioning member and the arm to position the element to singly locate predetermined portions of the articles at the given position, and means actuable to hold the article singly against displacement in the located positions.

2. In a soldering apparatus, a support for articles of varied contours, a unit movable relative to the support to successively feed parts to a given position relative to the support for soldering to the articles, a locating element, a positioning member, an arm pivotally supported for movement relative to the positioning member varied distances measured by articles disposed between the positioning member and the arm to position the element to singly locate predetermined portions of the articles at the given position, means to lock the arm in any one of the said positions, and means actuable to hold the article singly against displacement in the located positions.

3. In a soldering apparatus, a support for articles of varied contours, a unit movable relative to the support to successively feed parts to a given position relative to the support for soldering to the articles, a locating element, a positioning member, an arm pivotally supported for movement relative to the positioning member varied distances measured by articles disposed between the positioning member and the arm to position the element to singly locate predetermined portions of the articles at the given position, means actuable to hold the article singly against displacement in the located positions, and means movable into and out of a soldering position adjacent the given position to successively cause soldering of the parts to the articles.

4. In a soldering apparatus, a support for articles of varied contours, a unit movable relative to the support to successively feed parts to a given position relative to the support for soldering to the articles, a locating element, a positioning member, an arm pivotally supported for movement relative to the positioning member varied distances measured by articles disposed between the positioning member and the arm to position the element to singly locate predetermined portions of the articles at the given position, means actuable to hold the article singly against displacement in the located positions, a heat supplying unit supported for movement into and out of a soldering position adjacent the said given position, mechanism actuable to move the heat supplying unit into the soldering position, and means to latch the heat supplying unit in the soldering position.

5. In a soldering apparatus, a support for articles of varied contours, a unit movable relative to the support to successively feed parts to a given position relative to the support for soldering to the articles, a locating element, a positioning member, an arm pivotally supported for movement relative to the positioning member varied distances measured by articles disposed between the positioning member and the arm to position the element to singly locate predetermined portions of the articles at the given position, means actuable to hold the article singly against displacement in the located positions, a heat supplying unit supported for movement into and out of a soldering position adjacent the said given position, mechanism actuable to move the heat supplying unit into the soldering position, means to latch the heat supplying unit in the soldering position, and a timing unit actuable upon movement of the heat supplying unit to the soldering position to cause unlatching of it after a given length of time.

SVEN G. JOHANSSON.
HENRY C. SLECHTA.